INVENTOR.
HERBERT KROEMER
BY Gordon H. Telfer
ATTORNEY

INVENTOR.
HERBERT KROEMER
BY Gordon H Telfer
ATTORNEY

United States Patent Office 3,526,505

Patented Sept. 1, 1970

3,526,505
HOLOGRAPHIC METHOD OF FORMING AND ALIGNING PATTERNS ON A PHOTOSENSITIVE WORKPIECE

Herbert Kroemer, Menlo Park, Calif., assignor to Fairchild Camera and Instrument Corporation, Syosset, N.Y., a corporation of Delaware Filed Nov. 6, 1967, Ser. No. 680,682
Int. Cl. G03c *5/08*; G02b *27/00*
U.S. Cl. 96—36.2 4 Claims

ABSTRACT OF THE DISCLOSURE

Methods and apparatus are described for forming and reconstructing holographic images particularly for use as optical masks such as for the precise exposure of photosensitive material on workpieces such as semiconductor wafers. The method includes exposing an object transparency through a light diffuser by a parallel beam of coherent radiation that is of larger area than the diffuser. Scattered radiation strikes the object producing a diffraction light pattern which in turn produces an interference pattern with parallel radiation of the same beam passing by the diffuser. The interference pattern produces a hologram in a photosensitive medium. The image is reconstructed by exposing the hologram with a beam of coherent parallel radiation while blocking that portion that was in the area of the geometrical shadow of the diffuser producing a real image of the object in a plane at which a photosensitive workpiece is positioned. Alignment techniques are also disclosed for permitting an image to be placed in precise relationship with a previously formed pattern as is necessary, for example, in the application of successive masks during fabrication of microelectronic elements.

BACKGROUND OF THE INVENTION

Field of the invention

The invention relates to the field of holography in general and is particularly concerned with the use of holographic images as optical masks such as in the production of precise small size patterns on workpieces during microelectronic component fabrication.

Description of the prior art

It is the present practice for the exposure of photosensitive resists on workpieces such as semiconductor wafers to employ a contact mask produced by conventional photographic manipulations that is held directly against the workpiece resulting in the mask having short life. Even improvements in mask formation such as the use of metallic patterns does not sufficiently extend the life of the masks or improve their overall optical quality. Efforts have been applied to achieving systems permitting the projection printing of photoresist on workpieces. Conventional light sources have, however, when used in such a technique, resulted in undesirable limitations on resolution. Present procedures make every defect or dust in the mask appear as a defect in the exposed photoresist and, consequently, in the workpiece.

Recent interest has developed in the use of coherent parallel radiation from lasers for the exposure of fine patterns. The art of holography wherein lasers are used to form images by the phenomenon of wavefront reconstruction has been suggested. Such an approach is attractive because it should permit an accurate, lensless mask exposure system with a mask having long life.

A suggestion for the use of holography in exposing such workpieces is contained in an article by Field in "Electronic Design, June 21, 1966, pp. 17 and 18 entitled "Major Advance in Wafer-Making Forecast." This article suggests the great savings that may be possible through the use of holography in the production of semi-conductor devices. It, however, describes only certain well-known holographic techniques. Any apparatus or procedure that is intended for the large scale production of semiconductor devices or the like must be capable of use with nominal cost and low operator skill on a relatively reproductive basis. Straightforward application to the production field is by no means evident for previously demonstrated techniques. For example, the techniques described in the article are limited to exposure of areas of only about 1 square centimeter and the article states that problems of contrast are encountered.

SUMMARY OF THE INVENTION

Among the purposes of this invention are to provide high resolution and high contrast holograms capable of covering relatively large areas, that is at least as large as semiconductor wafers, with all of the inherent advantages of holographic printing while permitting a relatively simple arrangement of apparatus and moderate operator skill. Also among the purposes of the invention are to permit the successive application of holographically formed images upon a workpiece which is an essential requirement of semiconductor device fabrication.

The invention in brief achieves the aforementioned and additional objects and advantages through the provision of a method for forming an image by holography comprising arranging an object of which an image is to be formed in spaced relation with a light diffuser having substantially the same area as the object and illuminating the diffuser with a parallel beam of coherent radiation from a laser. The beam is of larger area than the diffuser so that scattered coherent radiation strikes the object producing a diffraction light pattern which in turn produces an interference pattern with parallel radiation of the same beam passing by the diffuser. This interference pattern when imposed upon a photosensitive medium results in a hologram. When used as an optical mask, the hologram is exposed by a beam of coherent radiation also from a laser while blocking that portion which was in the area of the geometrical shadow of the diffuser to form a diffracted light pattern producing a real image of the object on the opposite side of the hologram from the source of the beam and positioning a photosensitive workpiece in the plane of the real image.

Other aspects of the invention include the use of the formation of two images in a hologram at two different wavelengths in order to permit the use of one such image for alignment with the workpiece without exposing the photoresist and other techniques for such purposes.

DESCRIPTION OF THE PREFERRED EMBODIMENTS

Figure 1:
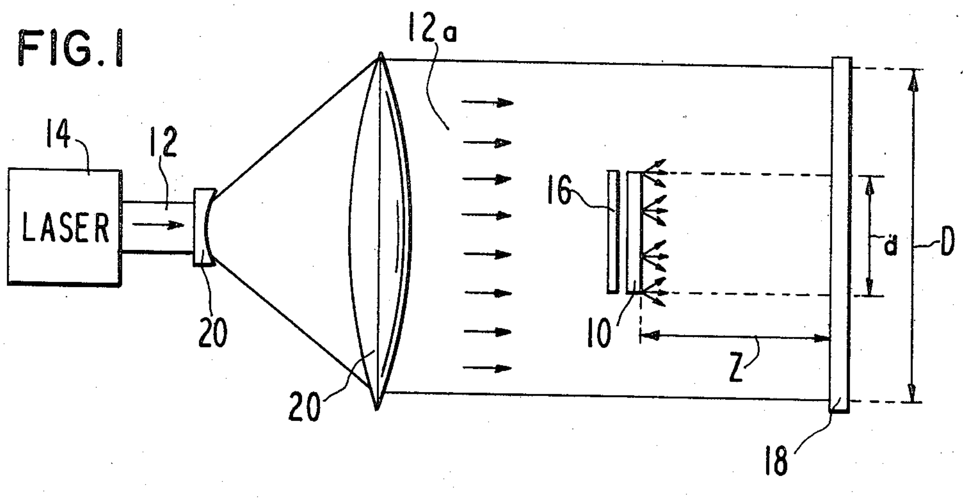
FIG. 1 is a schematic view illustrating generation of a hologram in accordance with this invention.

Referring now to FIG. 1, there is illustrated a system that includes an object transparency 10 that may be a piece of artwork reduced to the size intended for the ultimate image on a workpiece. This object transparency may be produced by known techniques involving the photographic reduction of an enlarged drawing. The object 10 is illuminated with a coherent light beam 12 from a laser 14 through a light diffuser 16. Although other optical systems may be employed the object image should preferably face the side away from the laser. As shown, a photosensitive medium 18 is positioned to receive the image.

The diffuser 16 may be of ground glass or some other medium that effectively scatters light with a minimum of absorption. The size of the diffuser should be such that the entire object image is illuminated only by diffused rather than by parallel light. The diffuser 16 should not, however, be appreciably larger than the object. The combination diffuser and object produces a diffraction pattern on the far side of the object. The diffuser and object should be spaced a distance that is large compared with the grain size of the diffuser. In order to generate the hologram this diffraction pattern must be brought into interference with the reference beam that is time coherent with the illuminating beam. In conventional holography, this reference beam is usually arranged at an angle to the line that connects the center of the object to the center of the hologram.

The holographic technique in accordance with this invention is a modification of that previously known such as is described in an article by Leith et al., Journal of the Optical Society of America, vol. 54, November 1964, pp. 1295–1301. The illuminating beam in accordance with this invention is made substantially larger in diameter in portion 12*a* than the diameter of the object 10. Beam portion 12*a* is at least two times and preferably at least about three times as large as the object, and the radiation that passes the object parallel to the above mentioned line is used as the reference beam. This reference beam is, of course, a hollow beam since there is no reference beam over that portion of the diffraction pattern that lies within the geometrical shadow of the diffuser-object combination. However, as will be apparent from the description of the image reconstruction process that follows, that portion of the hologram that lies inside the geometrical shadow area of the diffuser-object combination is unused.

The laser 14 employed in the practice of this invention may be any of those commercially available that provide a good coherent beam of light. Preferred are gas lasers that emit radiation in the visible portion of the spectrum such as an argon ion laser or a helium-neon laser. It is of course necessary that the laser produce light to which the photosensitive medium 18 is sensitive. It is also preferred that it be in the blue portion of the spectrum which provides a wide choice of photosensitive media including commercial photoresist material such as Kodak Photo Resist (KPR). Thus, an argon ion laser emissive of radiation having a wavelength of 4579 angstroms would be suitable, for example.

Various means may be employed for enlarging laser beams to the size required. As illustrated, a telescope optical system 20 may be employed for this purpose. However, to enlarge beam 12 to a size of about 6 inches as required for use with objects of about 2 inch diameter, such optical systems would be relatively expensive. Therefore, other known optical means employing mirrors could be employed such as by using a lens to focus the laser beam to a point with subsequent enlargement employing a parabolic mirror. Alternatively, a Cassegrainian optical system may be used.

The out of shadow hologram is produced by recording the out of shadow interference pattern between the reference beam and the diffraction pattern on a sufficiently large photographic plate 18 or other photosensitive medium placed at some distance, Z, behind the object 10. The distance Z is preferably a distance within the range of from about the internal diameter of the hollow reference beam, *d*, close to the object field diameter, and the external diameter, D, or the diameter of the photographic plate if the latter is smaller. The exposed photosensitive medium 18 is developed by well-known photographic techniques to produce a hologram.

The holographic technique here employed uses a Fresnel diffraction pattern that contrasts with that known to the art for making Fraunhofer holograms which are another type of hologram where the external portions of the primary beam itself serve as the reference beam. Fraunhofer holograms are, however, produced when the diffraction pattern is recorded in its far field, that is, when the geometrical shadow of the object field has been completely filled in by diffraction from outside the object. This takes places for distances Z that are much greater than $d/\lambda$ where $\lambda$ is the wavelength of the light. Z is therefore, in such system, a manageable distance only for very small objects since the far field of an object having a diameter of 1 centimeter starts at $2\times10^4$ centimeters, when $\lambda$ equals $5\times10^{-5}$ centimeters. If such a hologram is made and the image is recontructed by reducing the distance to the near field or Fresnel range, serious distortions result. The present technique which is a near field or Fresnel hologram technique is free of these distortions because of the fundamentally different use of a light diffuser and the selective use of the out of shadow portion of the hologram.

Figure 2:
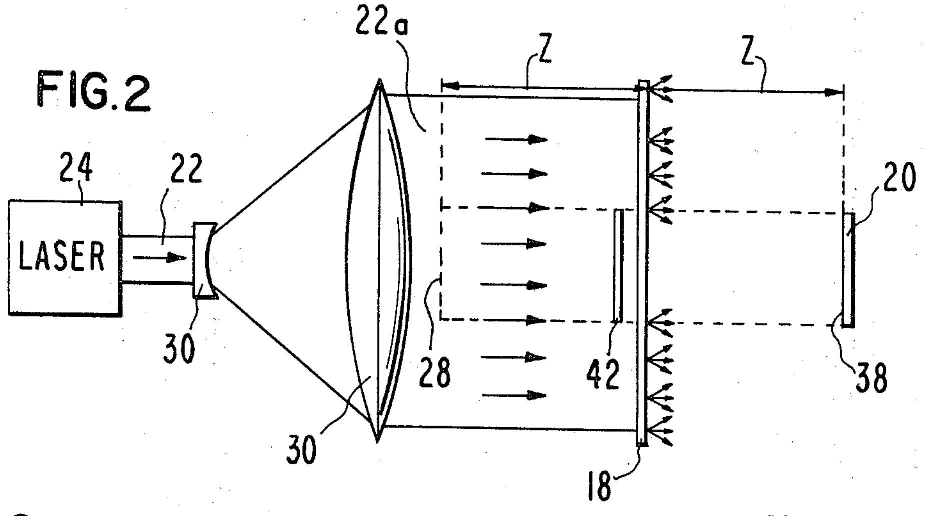
FIG. 2 is a schematic view illustrating reconstruction of an image in accordance with this invention.

Referring to FIG. 2, the image is reconstructed on a workpiece 20 by an arrangement which includes illuminating the hologram 18 with a light beam 22 that is again perpendicular to its plane. A similar technique for producing a large beam 22*a* of parallel coherent light is used employing laser 24 and telescope optics 30 although other optical schemes may be used here as well. The laser beam 22 should preferably be of the same wavelength as that used in forming the hologram. The light emerging on the far side of the hologram consists of undiffracted light and light that was diffracted by the hologram. The diffracted light consists of two well-defined portions. The first portion has a direction and intensity distribution as though the original object were still placed between the light source and the hologram, and as though the light emerged from that position thus forming a virtual image 28 of the object. The second part forms a real image 38 of the object on the opposite side of the hologram, in a mirror position to the virtual image. The external outline of the two areas defines a cylinder which is identical to the geometrical shadow area and of the original field. If all the light inside this shadow area is intercepted either before, inside, or immediately after the hologram, then the only light left on the far side of the plane of interception is light belonging to the real image. If then the substrate 20 to be exposed is placed in the plane of the real image it will be exposed by the real image without lowering of the contrast due to additional exposure from either the undiffracted illuminating beam or from the out of focus virtual image. For this purpose there has been illustrated in FIG. 2 a baffle 42 in front of the hologram as one way to achieve this interception but it may also be accomplished by other techniques.

A basic advantage of holographic masking over contact masking is that it does not require physical contact between the mask and the workpiece. This fact eliminates physical damage to the mask during handling and use. Furthermore, a system employing a laser provides optical precision not available in prior projection printing arrangements. A further advantage of great importance is that even if slight damage occurs or dust is present on a portion of the mask, the resulting image will still be a good one. The technique employed here using diffused light to illuminate the object necessarily causes the hologram to provide in each individual segment an image of the complete object.

In the use of the apparatus illustrated in FIG. 2 it is important that the hologram be spaced from the workpiece by the same distance Z as is employed during the generation of the hologram in FIG. 1 where the same wavelength light is used. This may be accomplished by using precision mechanical stops. If a different wavelength is used for reconstruction the distance should be Z times the ratio of the second wavelength to the first. It is further more necessary that the image and workpiece be aligned in the vertical plane, particularly when one image is to be positioned over a previously formed pattern on the workpiece. Accurate alignment is difficult when employing coherent monochromatic light of a wavelength to which the photosentitive resist on the workpiece is sensitive. Aligning the pattern in the same light would obviously expose the resist. There are, however, methods in accordance with this invention by which alignment may be achieved without undue exposure.

The first method utilizes the fact that different images can be superimposed within one hologram. In this method the original object is illuminated twice with coherent light of two separate wavelengths using the same apparatus as illustrated in FIG. 1. The photosensitive medium 18 is sensitive to both wavelengths. The photosensitive resist on workpiece 20 is sensitive to the shorter of the two wavelengths but not to the longer one. At least the longer wavelength radiation should be in the visible spectrum. This may be conveniently provided by, for example, using as the photosensitive material Kodak Photo Resist (KPR) which is sensitive to blue light but not to green light. Some commercially available lasers may selectively produce either light in the green or blue portions of the spectrum.

Figure 3:
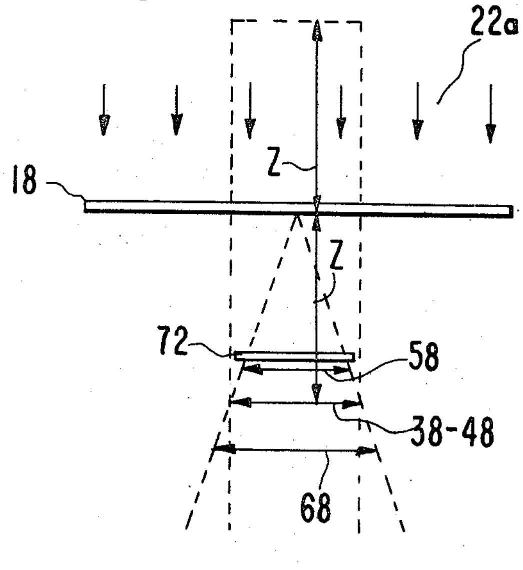
FIGS. 3, 4, 5, and 6 are schematic diagrams illustrating alignment of images in accordance with this invention.

In order to align a hologram and a wafer that already contains some pattern from a previous processing step (such as a pattern of diffused regions), the hologram is first illuminated with coherent light of the longer of the two wavelengths which is not one that exposes the photoresist. This illumination produces two reconstructed images of the original source object resulting from the two holographic images contained within the hologram 18 as illustrated in FIG. 3 of the drawing. The holographic image generated at the longer wavelength produces a reconstructed image 48 of the same size as the original source object and at the same distance Z from the hologram. The shorter wavelength holographic image (when illuminated by the longer wavelength light) produces a second reconstructed image 58 that is smaller and closer to the hologram by the same ratio as the ratio of the two wavelengths. The pattern on the wafer is then aligned in such a way that it coincides with the larger and more distant of the two images.

Once the wafer has been thus aligned it is exposed by illuminating the hologram 18 with the shorter of the two wavelengths. This illumination also produces two reconstructed images of different size and position. The short wavelength holographic image produces a reconstructed image 38 in the plane of the wafer which is used for exposing the wafer. The long wavelength holographic image produces a larger reconstructed image 68 farther away from the hologram.

Figure 4:
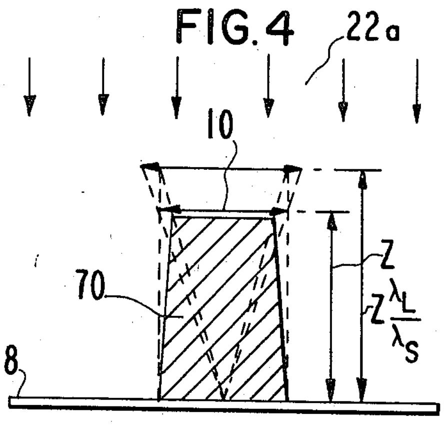

The light of this larger image 68 must not strike the wafer or it would impair resolution. In order to prevent that result two modifications in the hologram generation the long wavelength portion of the hologram. First, during the illumination of the original source object with the longer of the two wavelengths the center portion of the source image either is not illuminated or the light that has passed through that center portion is intercepted. A second requirement is that those light rays diffracted from the peripheral portion of the source image that might reach the side of the hologram opposite the center portion are intercepted. The ratio of the diameter of the unused to the used portion of the source image should be at least equal to the ratio of the shorter to the longer wavelength. FIG. 4 shows how both objectives can be achieved by inserting an intercepting cone 70 between the object 10 and the hologram 18 during the long wavelength exposure only. A geometrical construction indicating the minimum size of this cone in relation to the object size is also shown.

Similarly, the image produced by the other wavelength of radiation (image 58, FIG. 3) should not fall on the wafer during the exposure of the latter or during alignment. This is achieved by inserting, only during alignment, a baffle 72 slightly larger than this image within the sysimage produces a reconstructed image only along the periphery of the wafer, maximum alignment accuracy is achieved.

Lasers are available which permit operation at different wavelengths so that the two separate wavelengths required by this alignment procedure can be provided by a single laser. The argon ion laser is an example of one such instrument. For example, this laser produces a very strong green line near 5145 angstroms which is outside the sensitivity range of conventional photosensitive resis material such as KPR but well within the sensitivity of readily available photographic emulsions used to form the hologram. It also is near the sensitivity maximum of the human eye. Its threshold is among the lowest for this type of laser and the line is readily obtained in continuous wave operation. The green line may therefore be used as the longer of the two wavelengths in this alignment procedure. The blue line near 4579 angstroms is a good choice for the shorter wavelength. Since the alignment light may be left on during exposure and since the shorter wavelength lines typically have larger thresholds, exposure can be achieved simply by withdrawing the alignment baffle and increasing the power input into the laser either in a continuous wave or a pulsed fashion.

Since the ratio of the two mentioned wavelengths is approximately 0.89, the width of the alignment ring near the periphery of the wafer is about 10% of the wafer radius which is sufficient for alignment purposes. If a wider alignment ring is desired a more widely spaced pair of lines can be used.

A second procedure useful in the practice of this invention, if it is desired to use only a single laser wavelength, is to cover most of the wafer area during alignment and to expose only a small number of index areas or alignment fields near the periphery of the wafer. The wafer and the hologram can then be aligned relative to each other while observing the reconstructed image at the index marks.

Figure 5:
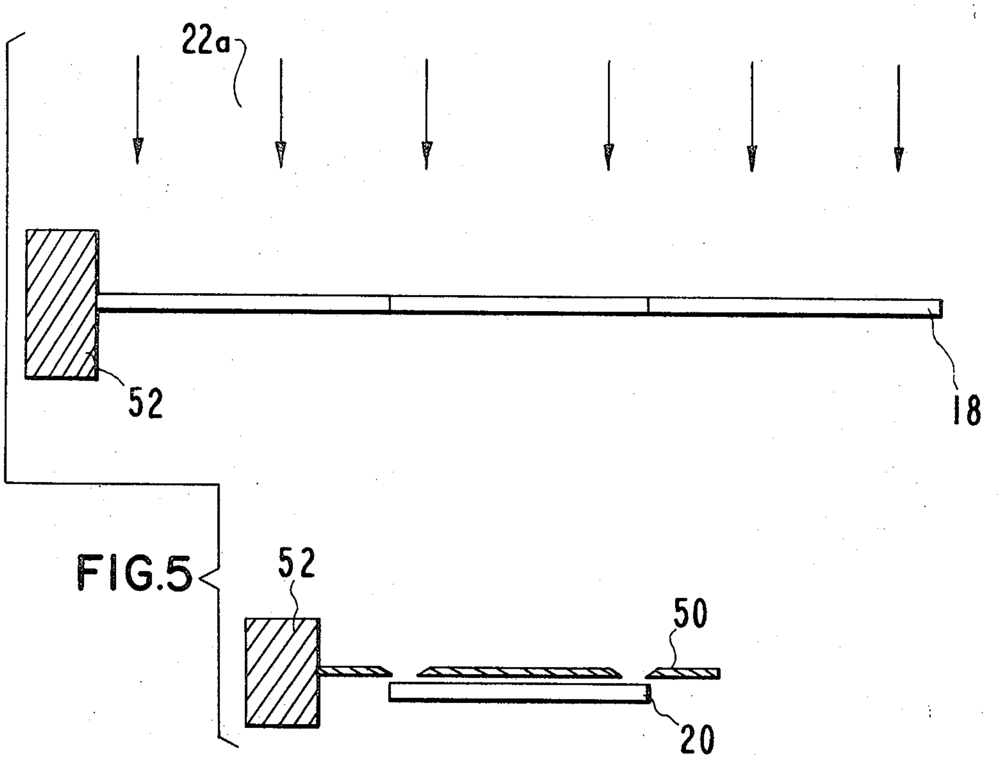

FIG. 5 illustrates the practice of this technique including the wafer 20, baffle 50 and hologram 18. Also shown are mechanical stops 52 that define the position of both the hologram and the beffle relative to the center line of the apparatus and therefore relative to each other. The baffle 50 is held in position near but not touching the surface of the work piece 20. The position of the alignment holes in the baffle is such that they are automatically centered about the alignment image mask when the baffle comes to rest against the mechanical stops.

A prealignment procedure may be carried out prior to the alignment of FIG. 5 using incoherent light of a wavelength to which the resist is not sensitive, such as yellow. The prealignment can be facilitated if the baffle 50 is not opaque for all wavelengths as with the baffle made from yellow glass or plastic. Fine alignment can then be carried out relative to the image mask actually produced by the hologram. After alignment has been accomplished the baffle is removed and the entire wafer is exposed. It is preferred that the baffle not only be opaque to the coherent light but should preferably absorb this light and not reflect it back to the hologram where it would reduce contrast of the alignment images.

Figure 6:
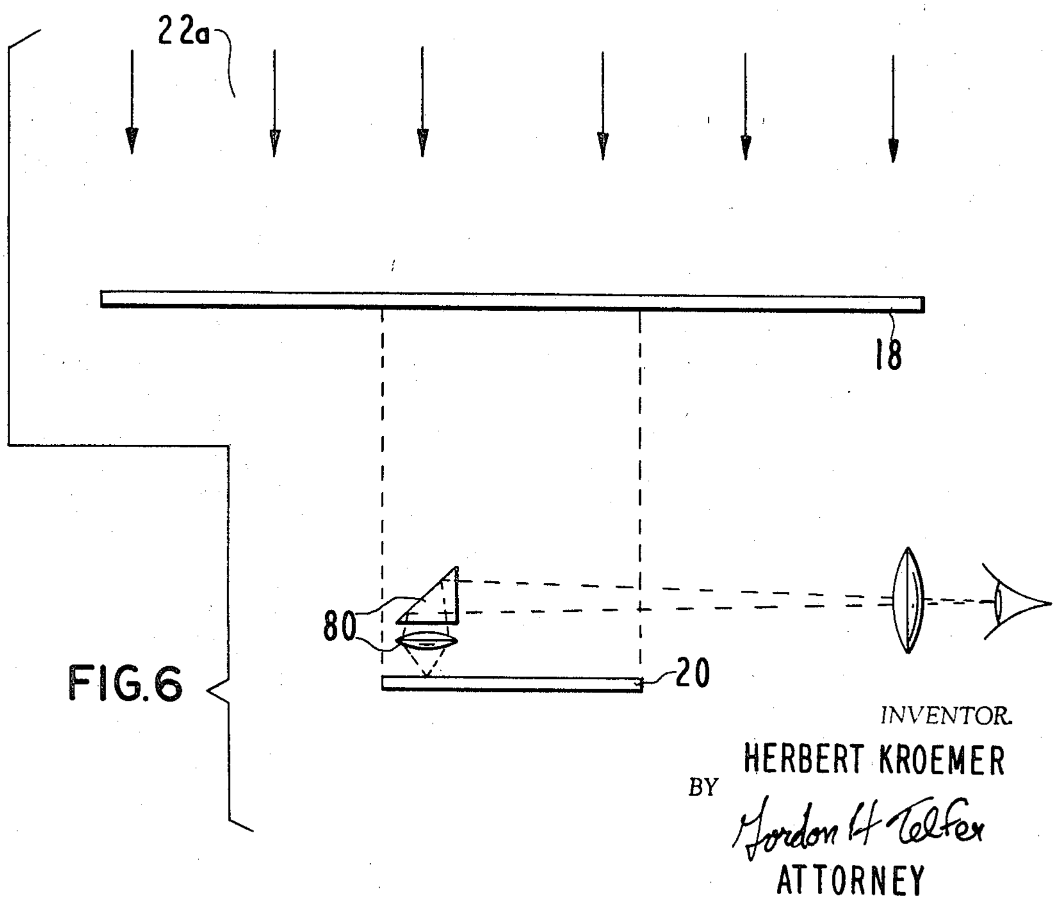

Care must be taken to eliminate any tilting of the hologram relative to the center line of the apparatus. This requirement, not present in contact masking, is met by observing the proper focus of the alignment image on at least three places on the wafer that do not lie on one line. A set of four alignment fields forming a square inscribed in the circular wafer is a suitable pattern for use. In order to view the alignment image in its coincidence with the alignment marks on the masks on the wafer use is made of the fact that this holographic technique does not utilize the center portion of the hologram thus enabling the placement of a set of microscope objectives 80 in this space as is illustrated in FIG. 6.

While the present invention has been shown and described in a few forms only, it will be apparent that modifications may be made without departing from the spirit and scope thereof.

What is claimed is:

1. A method for transferring a pattern from a first planar object to a photosensitive workpiece without the use of contact masks, which comprises:

arranging said first planar object containing said pattern to be transferred in spaced relation with a light diffuser having substantially the same area as the object;

positioning a photosensitive medium a selected distance from said first planar object, said distance being at least equal to the maximum lateral dimension of said first planar object and being not greater than the larger of the diameters of two beams of coherent light to be used to illuminate said diffuser and the diameter of said photosensitive medium;

illuminating said diffuser sequentially with said two parallel beams of coherent light, one beam containing coherent light of a short wavelength and the other beam containing coherent light of a long wavelength, each parallel beam possessing a diameter more than twice the diameter of said diffuser, to produce from said photosensitive medium a hologram containing a short wavelength diffraction pattern and a long wavelength diffraction pattern, said diffuser and said first planar object being located so that the normals to the surfaces of said diffuser and said first planar object are parallel to said two parallel beams of coherent light and so that portions of said two parallel beams pass by all portions of the edges of said diffuser and first planar object;

blocking, with an intercepting cone during illumination of said diffuser with said beam of long wavelength coherent light, all the volume in the central portion of the geometrical shadow between said first planar object and said photosensitive medium so as to prevent illumination of a selected portion of said photosensitive medium in said geometrical shadow by said long wavelength coherent light and thus to limit the long wavelength diffraction pattern representing the periphery of said first planar object to the non-selected portion of said photosensitive medium, said photosensitive medium being sensitive to both said short wavelength light and to said long wavelength light;

positioning and aligning a photosensitive workpiece in a plane parallel to said hologram, said photosensitive workpiece comprising a substrate of a semiconductor material having a layer of photosensitive material thereon, said workpiece being located the same distance from said hologram as said photosensitive medium was from said first planar object; and illuminating said hologram with a second parallel beam of coherent light possessing said short wavelength, said second parallel beam of coherent light being parallel to normals to the surfaces of both said hologram and said photosensitive workpiece, thereby to transfer said pattern on said first planar object to said photosensitive workpiece.

2. The method of claim 1 in which said step of positioning and aligning a photosensitive workpiece in a plane parallel to said hologram comprises the steps of illuminating said hologram and said photosensitive workpiece with a second coherent, parallel beam of light possessing said long wavelength, said long wavelength light producing two reconstructed images of said first planar object, said long wavelength light producing from said long wavelength diffraction pattern on said hologram a reconstructed image of the periphery of said first planar object, said reconstructed image of said periphery being the same size as the periphery of said first planar object, and the same distance from the hologram as said photosensitive medium was from said first planar object; and said long wavelength light producing from said short wavelength diffraction pattern on said hologram a reconstructed image of said first planar object that is smaller and closer to the hologram by the ratio of the short to the long wavelength than said reconstructed image of said periphery of said first planar object;

blocking, during said positioning of said photosensitive workpiece, the long wavelength light that passes through the short wavelength diffraction pattern in said selected portion of said hologram by placing a baffle between the hologram and the photosensitive workpiece, thereby to expose said photosensitive workpiece to long wavelength light only around the periphery of said photosensitive workpiece; and aligning the photosensitive workpiece so that it coincides and lies directly beneath and in the same plane as the real image produced from said long wavelength diffraction pattern on said hologram, said photosensitive workpiece being sensitive to said short wavelength light only.

3. The method of claim 2 including the additional step before said aligning step of prealigning said photosensitive workpiece with said baffle, by passing incoherent light of a wavelength to which said photosensitive workpiece is not sensitive through both said baffle and said photosensitive workpiece to allow said photosensitive workpiece to be placed approximately in proper relationship to said baffle.

4. The method of claim 2 wherein said photosensitive workpiece and said hologram are aligned by observing the proper focus of the alignment image on at least three places of said photosensitive workpiece that do not lie on a single line.

References Cited

UNITED STATES PATENTS 3,447,924 6/1969 Trzyna et al. -------- 96—36.2

OTHER REFERENCES

Leith et al.: Jour. of the Optical Soc. of Am., vol. 54, No. 11, November 1964, pp. 1295–1301.

Stroke et al.: British Jour. of Applied Physics, vol. 17, No. 4, April 1966, pp. 497–500 plus 2 plates at end of issue.

Field: Electronic Design, vol. 14, June 21, 1966, pp. 17–18.

DAVID SCHONBERG, Primary Examiner

R. J. STERN, Assistant Examiner

U.S. Cl. X.R.

96—27, 44; 350—3.5